(No Model.) 3 Sheets—Sheet 2.
W. P. HALE.
HARVESTER BINDER.

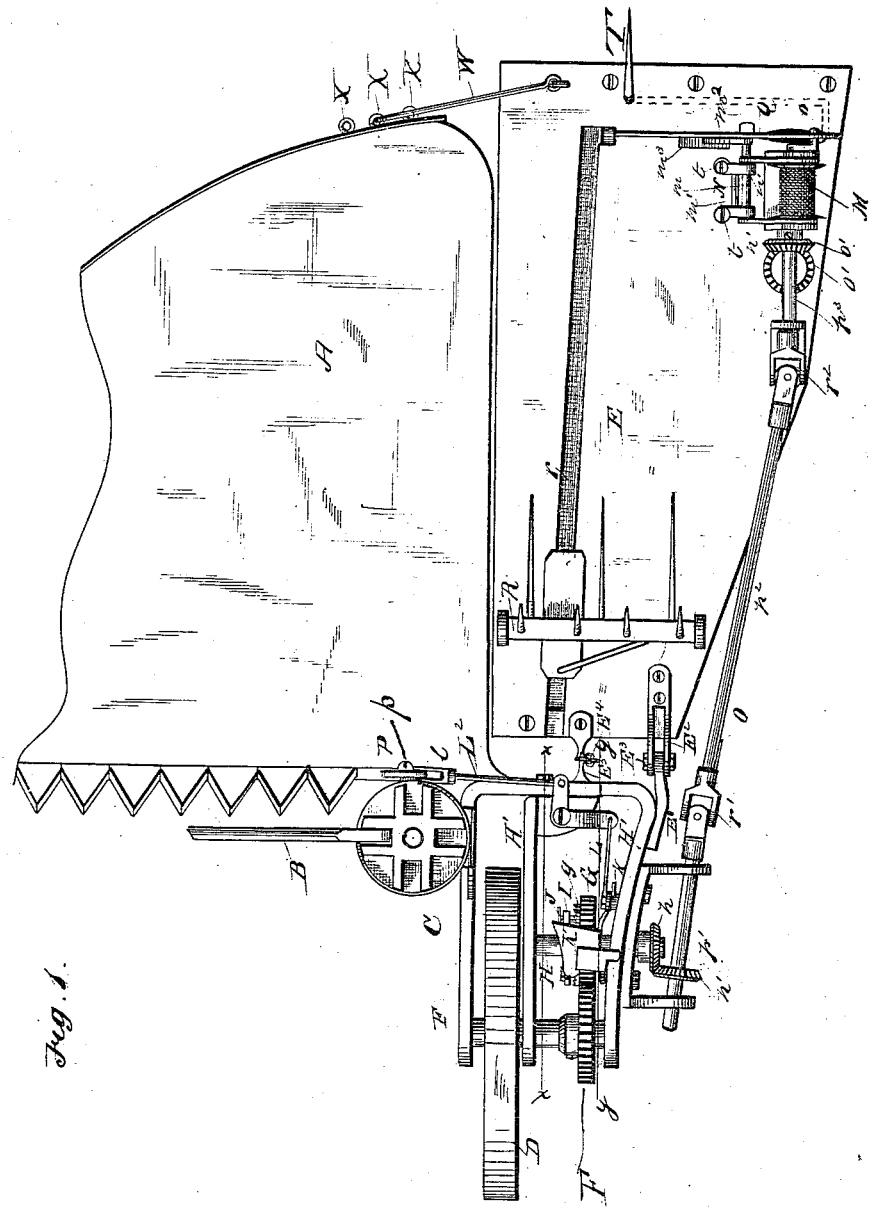

No. 259,386. Patented June 13, 1882.

Attest,
W. H. Knight
W. Blackstock.

Inventor,
Wm. P. Hale
R. L. Hill
His Atty.

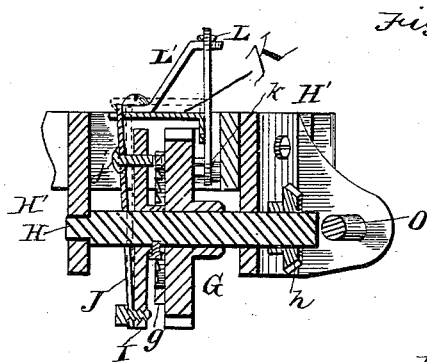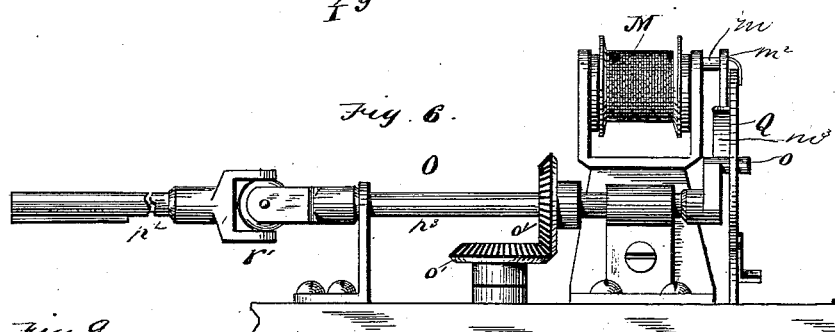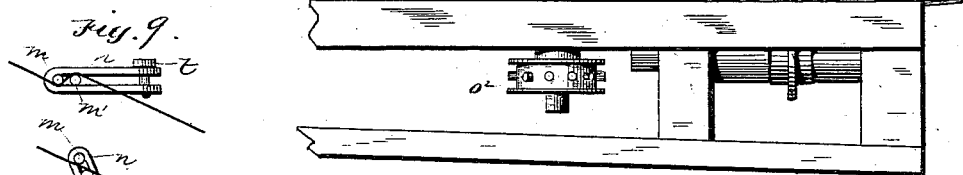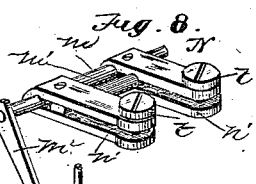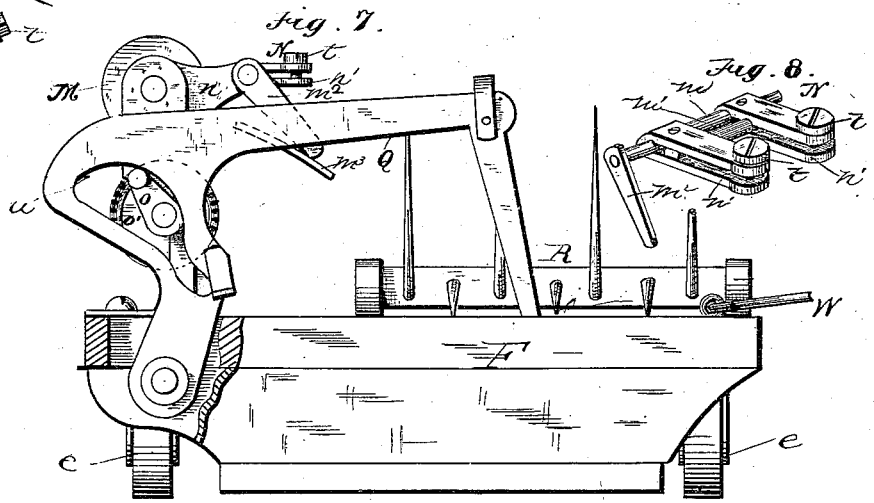

UNITED STATES PATENT OFFICE.

WILLIAM P. HALE, OF BROCKPORT, NEW YORK.

HARVESTER-BINDER.

SPECIFICATION forming part of Letters Patent No. 259,386, dated June 13, 1882.

Application filed February 23, 1882. (No model.)

*To all whom it may concern:*

Be it known that I, WILLIAM P. HALE, of Brockport, in the county of Monroe and State of New York, have invented certain new and useful Improvements in Grain-Binders; and I do hereby declare the following to be a full, clear, and exact description of the same, reference being had to the accompanying drawings, forming a part of this specification, in which—

Figure 3:
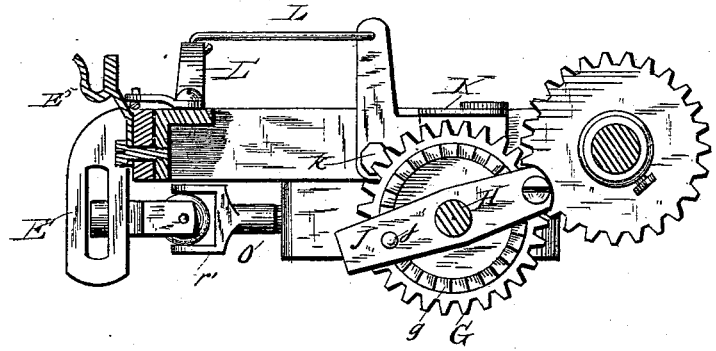
Figure 4:
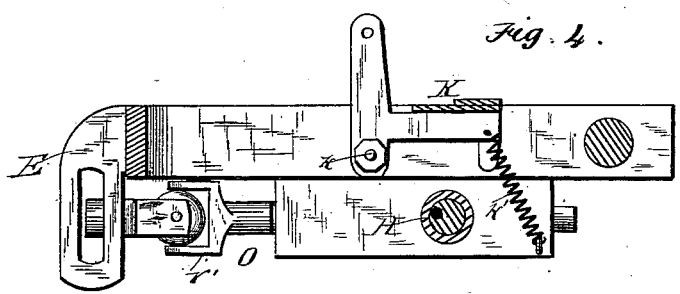
Figure 2:
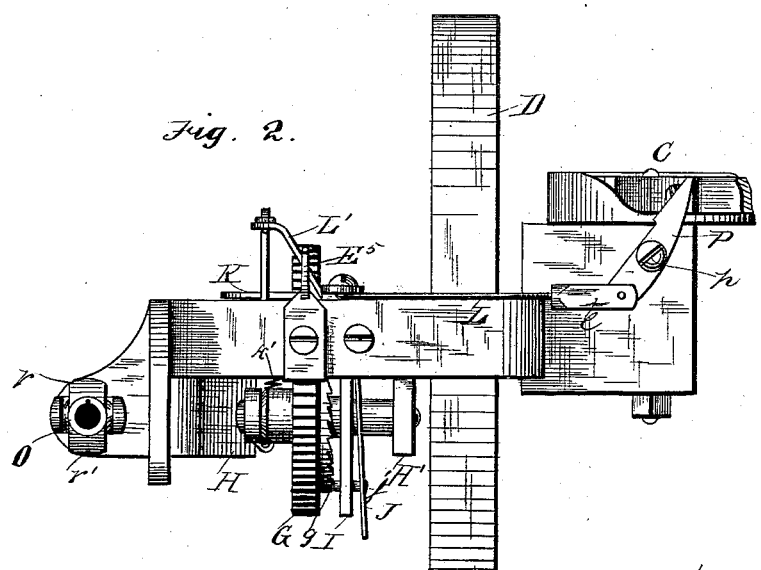

Figure 1 is a top plan view, showing the application of the binding apparatus to a harvester. Fig. 2 is a rear elevation of the harvester, showing the mechanism for throwing the binding apparatus in and out of operation. Fig. 3 is a sectional view taken on the line $x$ $x$, Fig. 1; Fig. 4, a sectional view taken on the line $y$ $y$, Fig. 1; Fig. 5, a sectional view taken on a line drawn longitudinally through the counter-shaft. Figs. 6 and 7 are side and end elevations, respectively, of the binding-truck, showing the binding-arm, wire-holder, tension device, &c. Fig. 8 is a perspective view of the tension device, and Figs. 9 and 10 views showing the operation of the tension device on the binding-wire.

This invention relates to that class of harvesting and binding machines in which a binding truck or carriage is attached to the frame of a harvester at the delivery side of the grain-platform in such manner that when the harvester-rake operates it sweeps the cut grain from said platform onto said truck or carriage, where it is compacted and bound into bundles, the binding mechanism on the truck or carriage being operated by power derived from the harvester, and said truck or carriage being supported in whole or in part upon its own wheels or runners, and being readily detachable, with all its mechanism, from the harvester, when desired.

The invention consists in certain novel improvements, which I will now proceed to describe.

Referring to the drawings, A represents the quadrant-shaped platform of a harvester; B, one of the arms of the harvester-rake; C, the rake-post and cam-track for operating the rake; D, the driving or traction wheel of the harvester; and E, the binding truck or carriage, mounted upon one or more wheels, $e$, and connected to the frame of the harvester by a coupling consisting of a slotted draft-bar, E', attached to the harvester, and a bifurcated bracket, $E^2$, secured to the truck or carriage and having a removable cross-bolt, $E^3$, as shown. This form of connection permits an independent movement of the binding truck or carriage and enables it to ride over any obstructions it may come in contact with.

The binding truck or carriage is suspended at any desired height within the limits of the slot in the draft-bar E' by means of a chain, $E^4$, fastened to it and adapted to engage with a hook, $E^5$, on the rear of the harvester-frame.

F is a gear-wheel fixed on the main axle of the harvester and rotating therewith.

G is a cog-wheel running loosely on a short counter-shaft, H, which has its bearings in the parts H' H' of the harvester-frame.

$g$ $g$ are ratchet-teeth on the side of the cog-wheel G.

I is a lever-bar fixed to the end of shaft H parallel to the ratchet side of the wheel G.

$j$ is a dog attached to a spring, J, and extending through a hole in the bar I, so as to engage with the ratchet-teeth $g$ when the spring J is not pressed outward away from the bar, and K is a cam-plate pivoted to the frame of the harvester at $k$, so as to be capable of being rocked up out of the way of the spring J by means of a draft-rod, L, but normally held down in the path of said spring by another spring, $k'$.

The rod L is articulated to a right-angled lever, L', and from the opposite arm of said lever another rod, $L^2$, having an adjustable screw-coupling, $l$, extends to the lower end of an upright lever, P, which is pivoted to the harvester-frame at $p$ and extends up into the path of the depressed or rocking arm of the harvester-rake, but not of the elevated or reel arms thereof. The result of this construction is that every rake-arm (but no reel-arm) strikes the end of the lever P and oscillates it on its pivot, so as to raise the cam-plate K away from the spring J, whereupon the latter springs in toward the gear-wheel and brings the dog $j$ into engagement with the ratchet-teeth on wheel G. The spring J and lever-bar I then rotate with said wheel, and, being fixed to the shaft H, compel the latter to also rotate. As soon as the rake-arm has passed over the end of the lever P the spring $k'$ forces the cam-plate K down again, thereby restoring the lever P to its normal position; but the cam-plate, when thus forced down, comes again in the path of the spring J, and when the wheel G' revolves far enough said spring strikes the inclined side of the cam-plate, and is thereby pressed out until the dog $j$ is disengaged from the ratchet-teeth $g$, whereupon the shaft H ceases to rotate. The parts are so constructed and arranged that the shaft H will make one revolution before its movement is thus arrested by the disengagement of the dog. The shaft H thus operated gives motion by means of bevel-gears $h\ h'$ to a tumbling-rod, O, which, by means of a crank, $o$, or its equivalent, actuates the band-carrying arm Q, and by means of bevel-gears $o'$ and a sprocket-wheel, $o^2$, and chain actuates the main binding-gear, (not necessary to be shown herein,) that drives the secondary or binding rake R, the latter being guided by a slot, $r$, in the platform E.

The tumbling-rod O is preferably made in three parts, $p'\ p^2\ p^3$, connected by universal couplings $r'\ r^2$.

An adjustable sliding connection is effected between the part $p^2$ and the portion of the coupling $r'$ with which said part $p^2$ engages by forming a grooved socket in said portion of coupling $r'$ and a longitudinal feather upon the part $p^2$, as shown in Figs. 1, 2, and 6. This sliding connection enables the tumbling-rod to accommodate itself to all the positions the binding truck or carriage may assume with respect to the harvester, and also permits said tumbling-rod to be separated at the coupling $r'$ when it is desired to detach the binding-truck from the harvester.

The band-spool M is hung over the tumbling-rod between the gear and crank, and a slight friction is applied to it to prevent it from unwinding too readily.

The band is passed through between two rods, $m\ m'$, one of which, $m$, is mounted in bearings in stationary arms $n\ n$ and forms the axis for a frame, N, that holds the other rod, $m'$.

The frame N, and with it the rod $m'$, is rocked forward and backward half-way around on the rod $m$ by means of a lever-arm, $m^2$, fixed to the projecting end of rod $m$, and a cam-flange, $m^3$, on the band-carrying arm Q.

When the band-carrying arm is raised the band is not cramped or bent around the rods $m\ m'$, but has a free passage through between them, and when the band-carrying arm is depressed the cam-flange $m^3$ strikes the lever-arm $m^2$, and, moving the frame N upward and backward, causes the band to be bent into the form of the letter S by the rods $m\ m'$, thus imparting to said band the requisite tension. This tension, it will be observed, is brought directly in the band itself, and not on the spool, and is thereby uniform, whether the spool be large or small.

The parts $n'\ n'$ of frame N are slotted longitudinally, so that the rod $m'$ can be moved farther from or nearer to the rod $m$ to adjust the tension, and set-screws $t\ t$ are provided, whereby to clamp said rod $m'$ tightly in its adjusted position.

T is a compressing-arm, which rises up behind the bundle and acts as a compressor when the band-carrying arm descends and falls down when the band-carrying arm goes up for the purpose of delivering the bundle.

The band-carrying arm has a peculiar movement imparted to it by a cam, $u$, operating in connection with the crank on the tumbling-rod, whereby the band-carrying arm is raised to its proper height and held there while the grain is being carried under it, then is quickly forced down behind the bundle, while the rake R and compressor T hold the latter in position, and then remains firmly down while the twisting or tying is accomplished and until the binding mechanism is again operated.

The twisting or tying mechanism, though not shown herein, may be like that shown in my pending application, filed April 3, 1879, or of any other suitable construction.

In constructing the machine care should be taken to so proportion the gears F G that run the binding mechanism to the gears or belt-pulleys that run the main harvester-rake as that the wheel G shall make one entire revolution between the time when one rake-arm strikes the lever P and the time when the next succeeding rake-arm will strike the same lever.

A hook, W, is attached to the rear end of the binding truck or carriage and a series of eyes or staples, X, placed at different points on the rear end of the harvester-platform for said hook to engage with, whereby the rear end of the binding-truck is held connected to the harvester-platform and brought nearer to or carried farther away from the same, according to the length of grain to be bound.

I claim—

1. The combination of the fixed gear-wheel on the main axle of the harvester, the loose gear-wheel on the counter-shaft, the lever-arm and spring for locking the loose gear-wheel to the counter-shaft, and the rocking cam for automatically throwing the lever-arm and spring out of connection with the loose wheel to stop the motion of the counter-shaft and arrest the operation of the binding mechanism, substantially as described.

2. The combination of the trip-lever P, operated from the harvester-rake, with the rocking cam, means for connecting the trip-lever to the rocking cam, the fixed gear, the loose gear, the lever-arm and spring, and the counter-shaft, substantially as described, for the purpose specified.

3. The combination of the slotted draft-bar on the harvester-frame, the bracket on the binding truck or carriage, and the cross-bolt passed through said bracket and working in the slot of the draft-bar, with the adjusting-chain and hook for holding the end of the truck at the desired elevation, substantially as described, for the purpose specified.

4. The hooks W, fastened to the binding-truck, in combination with the series of eyes or staples on the harvester-platform, whereby the rear end of the binding-truck is enabled to be brought nearer to or carried farther away from the harvester-platform, according to the length of grain to be bound, substantially as described.

5. A tension device consisting of two substantially parallel rods arranged so as to allow the band to pass freely between them while the band-carrying arm is being elevated, and to be rotated to form a kink or bend in the band while the band-carrying arm is descending, whereby to take up the slack in the band and produce the requisite tension, substantially as described.

6. The combination, substantially as herein described, of the band-spool, the rod $m$, mounted in bearings in the arms $n$ $n$, the movable frame carrying the rod $m'$, and means for rocking said frame to create the tension on the band passing between said rods $m$ and $m'$, substantially as described.

7. The combination of the band-spool, the rod $m$, the movable frame carrying the rod $m'$, the arm $m^2$ on the projecting end of rod $m$, and the cam-flange $m^3$ on the side of the band-carrying arm, substantially as described.

WILLIAM P. HALE.

Witnesses:
   C. A. SHERWOOD,
   F. S. STEBBINS.